US010990320B2

(12) United States Patent
Gola et al.

(10) Patent No.: US 10,990,320 B2
(45) Date of Patent: Apr. 27, 2021

(54) SYSTEMS AND METHODS TO OPTIMALLY SELECT METABLOCKS

(71) Applicant: Western Digital Technologies, Inc., San Jose, CA (US)

(72) Inventors: Elad Gola, Kfar Saba (IL); Roi Jazcilevich, Kfar Saba (IL); Arseniy Aharonov, Kfar Saba (IL)

(73) Assignee: Western Digital Technologies, Inc., San Jose, CA (US)

( * ) Notice: Subject to any disclaimer, the term of this patent is extended or adjusted under 35 U.S.C. 154(b) by 170 days.

(21) Appl. No.: 16/265,056

(22) Filed: Feb. 1, 2019

(65) Prior Publication Data

US 2020/0249870 A1 Aug. 6, 2020

(51) Int. Cl.
*G06F 3/06* (2006.01)

(52) U.S. Cl.
CPC .......... *G06F 3/0659* (2013.01); *G06F 3/0604* (2013.01); *G06F 3/064* (2013.01); *G06F 3/0673* (2013.01)

(58) Field of Classification Search
CPC ...... G06F 3/0659; G06F 3/0604; G06F 3/064; G06F 3/0673

USPC .................. 711/103, E12.008, E12.001, 154
See application file for complete search history.

(56) References Cited

U.S. PATENT DOCUMENTS

| 9,158,674 | B2 * | 10/2015 | Verhaeghe | .......... G06F 12/0246 |
| 2005/0144367 | A1 * | 6/2005 | Sinclair | ............... G06F 12/0246 711/103 |
| 2016/0004464 | A1 * | 1/2016 | Shen | ...................... G06F 3/0616 711/103 |
| 2016/0357474 | A1 * | 12/2016 | Frid | ...................... G06F 3/0656 |

\* cited by examiner

*Primary Examiner* — Tuan V Thai
*Assistant Examiner* — Edward Waddy, Jr.
(74) *Attorney, Agent, or Firm* — Vierra Magen Marcus LLP

(57) ABSTRACT

Disclosed is an apparatus including a memory system. The memory system includes a controller that assigns a first PEC to a first metablock based on a first number of structures of a memory across which the first metablock is distributed. The controller assigns a second PEC to a second metablock based on a second number of the structures of the memory across which the second metablock is distributed. The controller selects one of the first metablock or the second metablock to be used based on the first PEC and the second PEC.

20 Claims, 6 Drawing Sheets

SYSTEMS AND METHODS TO OPTIMALLY SELECT METABLOCKS

BACKGROUND

The following description is provided to assist the understanding of the reader. None of the information provided is admitted to be prior art.

Non-volatile data storage devices, such as embedded memory devices (e.g., embedded MultiMedia Card (eMMC) devices) and removable memory devices (e.g., removable universal serial bus (USB) flash memory devices and other removable storage cards), have allowed for increased portability of data and software applications. Users of non-volatile data storage devices increasingly rely on the non-volatile storage devices to store and provide rapid access to a large amount of data.

In some examples, a number of physical blocks of the non-volatile data storage devices may be grouped together to form a metablock, sometimes referred to as a superblock. Using metablocks may improve the reliability of the non-volatile data storage device because the physical blocks of the metablock may be distributed across one or more physical structures of the non-volatile data storage device such as, for example, dies and/or planes. Read and/or write speeds of the non-volatile data storage device may also be improved with metablocks because the physical block(s) on each physical structure may be read and/or written in parallel with the block(s) of the metablock on the other physical structures. However, the blocks of different metablocks may be distributed across respective different numbers of physical structures, which may cause an imbalanced performance among different metablocks.

SUMMARY

Various embodiments are related to a memory system. The memory system includes a controller. The controller is configured to assign a first PEC to a first metablock based on a first number of structures of a memory across which the first metablock is distributed. The controller is configured to assign a second PEC to a second metablock based on a second number of the structures of the memory across which the second metablock is distributed. The controller is configured to select one of the first metablock or the second metablock to be used based on the first PEC and the second PEC.

In one or more embodiments, the controller is further configured to determine the first metablock is a normal metablock based on the first number of the structures of the memory across which the first metablock is distributed. The controller is further configured to determine the second metablock is a twisted metablock based on the second number of the structures of the memory across which the second metablock is distributed. The second number is less than the first number.

In one or more embodiments, the controller is further configured to maintain the first PEC at a same value, and increase the second PEC from a previous value.

In one or more embodiments, the controller is further configured to prioritize using the first metablock over the second metablock in response to a power-on operation of the memory system, e.g., the memory system being initially powered on or reset.

In one or more embodiments, the controller is further configured to prioritize using the second metablock over the first metablock in response to determining that a number of the metablocks that are capable of being written is less than a predefined threshold.

In one or more embodiments, the controller is further configured to determine the first metablock as a normal metablock in response to determining the first number being equal to a total number of the structures of the memory, and determine the second metablock as a twisted metablock in response to determining the second number being less than the second number.

In one or more embodiments, the controller is further configured to monitor the first PEC by counting a number of PECs for which the first metablock has been used.

In one or more embodiments, the controller is further configured to monitor the second PEC by counting a number of PECs for which the second metablock has been used, and increase the second PEC by combining the second PEC with a positive term.

In one or more embodiments, the controller is further configured to determine a maximum PEC of the memory and a number of twisted exponents, and associate the second metablock with a twisted exponent of the number of twisted exponents.

In one or more embodiments, the controller is further configured to calculate the positive term as $$\left(\frac{\text{MAX} - avgPEC}{\text{MAX}}\right)2^l,$$

where MAX represents the maximum PEC of the memory, avgPEC represents an average of respective PECs of the number of metablocks, and l represents the twisted exponent.

Various embodiments disclosed herein are related to a memory system. The memory system includes a memory including a number of physical blocks. Each of a number of metablocks includes a corresponding set of the physical blocks. The physical blocks included in the corresponding set of physical blocks of each of the metablocks are distributed across respective structures of the memory. The memory system includes a controller. The controller is configured to identify a first metablock of the number of metablocks and a first number of the structures of the memory across which the first metablock is distributed. The controller is configured to associate the first metablock with a first twisted exponent in response to determining that the first number is equal to a maximum number of the structures of the memory. The controller is configured to identify a second metablock of the number of metablocks and a second number of the structures of the memory across which the second metablock is distributed. The controller is configured to associate the second metablock with a second twisted exponent in response to determining that the second number is less than the maximum number of the structures of the memory. The controller is configured to assign a first PEC to the first metablock based on the first twisted exponent and assign a second PEC to the second metablock based on the second twisted exponent. The controller is configured to cause one of the first metablock or the second metablock to be selected for a write operation based on the assigned first PEC and the assigned second PEC.

In one or more embodiments, the controller is further configured to select the first metablock over the second metablock for the write operation in response to the memory system being initially powered on.

In one or more embodiments, the controller is further configured to select the second metablock over the first metablock for the write operation in response to determining that a number of the metablocks that are capable of being written is less than a predefined threshold.

In one or more embodiments, the controller is further configured to determine whether to maintain or increase monitored first and second PECs based on the following equation $$\left(\frac{MAX - avgPEC}{MAX}\right)2^l,$$

where MAX represents a maximum PEC of the memory, avgPEC represents an average of respective PECs of the number of metablocks, and l represents the first or second twisted exponent.

In one or more embodiments, the controller is further configured to determine the monitored first PEC by counting a number of PECs for which the first metablock has been used, and determine the first twisted exponent as zero to maintain the monitored first PEC as the assigned first PEC.

In one or more embodiments, the controller is further configured to determine the monitored second PEC by counting a number of PECs for which the second metablock has been used, and determine the second twisted exponent as non-zero to increase the monitored second PEC as the assigned second PEC.

Various embodiments disclosed herein are related to a method including counting a first number of the structures of a memory across which a first metablock of a number of metablocks is distributed. The memory comprises a number of physical blocks. Each metablock of the number of metablocks includes a corresponding set of the physical blocks, and the physical blocks included in the corresponding set of physical blocks of each of the metablocks are distributed across respective structures of the memory. The method includes identifying the first metablock as a normal metablock in response to determining that the first number is equal to a maximum number of the structures of the memory. The method includes counting a second number of the structures of the memory across which a second metablock of the number of metablocks is distributed. The method includes identifying the second metablock as a twisted metablock in response to determining that the second number is less than the maximum number of the structures of the memory. The method includes maintaining a first PEC of the first metablock and increasing a second PEC of the second metablock. The method includes selecting one of the first metablock or the second metablock based on the first PEC and the second PEC.

In one or more embodiments, the method further includes selecting the first metablock over the second metablock for a write operation in response to the memory system being initially powered on.

In one or more embodiments, the method further includes selecting the second metablock over the first metablock in response to determining that a number of the metablocks that are capable of being written is less than a predefined threshold.

In one or more embodiments, the method further includes determining a maximum PEC of the memory and a number of twisted exponents. The method further includes associating the first metablock with a first twisted exponent of the number of twisted exponents and the second metablock with a second twisted exponent of the number of twisted exponents. The method further includes determining whether to maintain or increase the first and second PECs based on the following equation $$\left(\frac{MAX - avgPEC}{MAX}\right)2^l,$$

where MAX represents the maximum PEC of the memory, avgPEC represents an average of respective PECs of the number of metablocks, and l represents the first or the second twisted exponent.

The foregoing summary is illustrative and is not intended to be in any way limiting. In addition to the illustrative aspects, embodiments, and features described above, further aspects, embodiments, and features will become apparent by reference to the following drawings and the detailed description.

Figure 1:
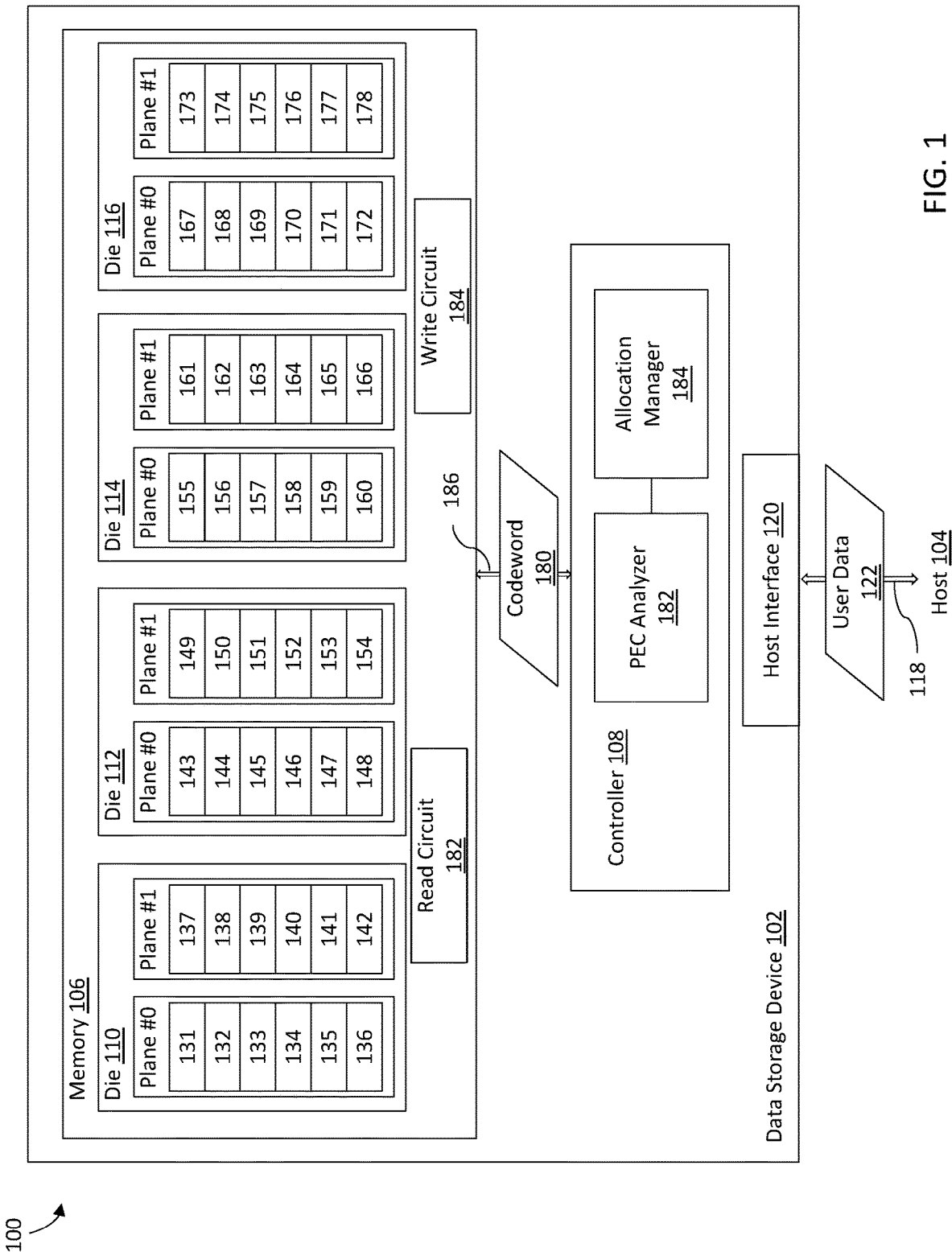
FIG. 1 is a block diagram of a system including a memory and a controller according to an example embodiment.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Various embodiments disclosed herein are related to a data storage device that includes a memory, a program/erase cycle (PEC) analyzer, and an allocation manager. The memory can include a number of physical blocks, or simply blocks. The memory can further include a number of metablocks, each of which includes a respective logical grouping of blocks that are distributed across respective physical structure(s) of the memory, e.g., dies and/or planes. In some embodiments, the PEC analyzer can assign respective PECs to different metablocks based on an extent to which the different metablocks are distributed across the physical structures of the memory. The extent to which a metablock is distributed across the physical structures of the memory may be referred to as how twisted the metablock is or the twistedness of the metablock. For example, the PEC analyzer may determine the twistedness of a metablock by identifying the number of physical structures across which the blocks of the metablock are distributed and comparing that number with a total number of the physical structures of the memory. Determining that a metablock is distributed across a relatively lower number of physical structures of the memory indicates that the metablock is relatively highly twisted, and vice versa. In some embodiments, the PEC analyzer may assign different PECs to the metablocks based on their respective twistedness. For example, a metablock with a lower twistedness may be assigned a lower PEC; and a metablock with a higher twistedness may be assigned a higher PEC.

The allocation manager may use such assigned PECs to select when to use the metablocks and which metablocks to use. For example, the allocation manager may select the metablock with a lower assigned PEC during the beginning of life (BOL) of the memory while keeping the metablock with a higher assigned PEC for use during or toward the end of life (EOL) of the memory. Metablocks that are distributed across fewer physical structures (i.e., have a higher twistedness) generally exhibit poorer performance as compared to metablocks distributed across more physical structures (i.e., having a lower twistedness). As such, a metablock with a lower twistedness (lower assigned PEC) can be prioritized for use over a metablock with a higher twistedness (higher assigned PEC) for storing data during the BOL of the memory. Further, during the EOL of the memory, as the usage of the metablocks with a lower twistedness is increased, the metablocks with a higher twistedness can be used to store data, which may advantageously even the wearing of all the metablocks across the memory. Accordingly, one metablock is not used more often than another metablock across the memory, which causes a lifetime of the memory to be advantageously extended without compromising the performance of the memory. In addition, the improved wear leveling achieved using the approach described herein also reduces variance in erase counts of blocks and reduces write amplification due to static cold data migration.

FIG. 1 is a block diagram of a system 100 in accordance with some embodiments. The system 100 includes a data storage device 102 and a host device 104. The data storage device 102 includes a memory 106 and a controller 108 (e.g., a memory controller) communicatively coupled to the memory 106. The memory 106 includes multiple dies 110-116 that each further includes one or more structures, e.g., each die includes a plane #0 and a plane #1, and each of the planes further includes a number of physical blocks, or blocks. In other embodiments, the memory 106 may include fewer are more dies, fewer or more planes, and fewer or more blocks than shown in FIG. 1. In some embodiments, the data storage device 102 logically links together blocks from the multiple memory dies and/or planes to define "metablocks" (or "superblocks") as groups of blocks that span one or more of the multiple memory dies for read and write operations, which shall be discussed in further detail below. In one such embodiment, the controller 108 logically links the blocks. The controller 108 may be any hardware, software, logical block, or combination thereof that performs one or more control aspects with respect to a memory-based device or system. For instance, the controller 108 can include any application, program, library, script, task, service, process or any type and form of executable instructions executing on hardware of a device to perform various read, write, or other control operations. The hardware may include circuitry such as one or more processors in one or more embodiments.

The data storage device 102 may be embedded within the host device 104, such as in accordance with an embedded MultiMedia Card (eMMC®) (trademark of Joint Electron Devices Engineering Council (JEDEC) Solid State Technology Association, Arlington, Va.) configuration. Alternatively, the data storage device 102 may be removable from (e.g., removably coupled to) the host device 104. For example, the data storage device 102 may be removably coupled to the host device 104 in accordance with a removable universal serial bus (USB) configuration. In some embodiments, the data storage device 102 may include or correspond to a solid state drive (SSD), which may be used as an embedded storage drive, an enterprise storage drive (ESD), or a cloud storage drive (CSD), as illustrative, non-limiting examples.

The data storage device 102 is coupled to the host device 104 via a communication path 118, such as a wired communication path and/or a wireless communication path. For example, the data storage device 102 may include an interface 120 (e.g., a host interface) that enables communication (via the communication path 118) between the data storage device 102 and the host device 104, such as when the interface 120 is coupled to the host device 104.

The data storage device 102 may be coupled to the host device 104 as embedded memory, such as embedded MultiMedia Card (eMMC®) (trademark of JEDEC Solid State Technology Association, Arlington, Va.) and embedded secure digital (eSD) (Secure Digital (SD®) is a trademark of SD-3C LLC, Wilmington, Del.), as illustrative examples. To illustrate, the data storage device 102 may correspond to an eMMC (embedded MultiMedia Card) device. As another example, the data storage device 102 may correspond to a memory card, such as a Secure Digital (SD®) card, a micro SD® card, a miniSD™ card (trademarks of SD-3C LLC, Wilmington, Del.), a MultiMediaCard™ (MMC™) card (trademark of JEDEC Solid State Technology Association, Arlington, Va.), or a CompactFlash® (CF) card (trademark of SanDisk Corporation, Milpitas, Calif.). The data storage device 102 may operate in compliance with a JEDEC industry specification. For example, the data storage device 102 may operate in compliance with a JEDEC eMMC specification, a JEDEC Universal Flash Storage (UFS) specification, one or more other specifications, or a combination thereof.

The host device 104 may include a processor and a memory. The memory may be configured to store data and/or instructions that may be executable by the processor. The memory may be a single memory or may include one or more memories, such as one or more non-volatile memories, one or more volatile memories, or a combination thereof. The host device 104 may issue one or more commands to the data storage device 102 such as, for example, one or more requests to read data from or write data to the memory 106 of the data storage device 102.

The host device 104 may provide data, such as user data 122, to be stored at the memory 106 (a write operation) or to request data to be read from the memory 106 (a read operation). For example, the user data 122 may have a size that corresponds to a size of a metablock at the data storage device 102 (rather than corresponding to a size of an individual block). The host device 104 may include a mobile telephone, a music player, a video player, a gaming console, an electronic book reader, a personal digital assistant (PDA), a computer, such as a laptop computer or notebook computer, any other electronic device, or any combination thereof. The host device 104 can communicate via a memory interface that enables reading from the memory 106 and writing to the memory 106. For example, the host device 104 may operate in compliance with a Joint Electron Devices Engineering Council (JEDEC) industry specification, such as a Universal Flash Storage (UFS) Host Controller Interface specification. In another example, the host device 104 may operate in compliance with one or more other specifications, such as a Secure Digital (SD) Host Controller specification as an illustrative example. The host device 104 may communicate with the memory 106 in accordance with any other suitable communication protocol.

In the illustrated embodiment of FIG. 1, the memory 106 includes four dies, each of the dies further include two planes, and each of the planes can include six blocks. It is understood FIG. 1 is provided for illustration purposes. In other embodiments, the memory 106 can include any number of dies (fewer or more than four dies), each of the dies can include any number of planes (fewer or more than two planes), and each of the planes can include any number of blocks (fewer or more than six blocks) while remaining within the scope of the present disclosure.

Referring still to FIG. 1, each of the dies 110, 112, 114, and 116 of the memory 106 includes a plane 0 and a plane 1, each of which includes multiple blocks, illustrated as six blocks per plane. For example, plane 0 of die 110 is illustrated as having six blocks 131, 132, 133, 134, 135, and 136; plane 0 of die 110 is illustrated as having six blocks 131, 132, 133, 134, 135, and 136; plane 1 of die 110 is illustrated as having six blocks 137, 138, 139, 140, 141, and 141; plane 0 of die 112 is illustrated as having six blocks 143, 144, 145, 146, 147, and 148; plane 1 of die 112 is illustrated as having six blocks 149, 150, 151, 152, 153, and 154; plane 0 of die 114 is illustrated as having six blocks 155, 156, 157, 158, 159, and 160; plane 1 of die 114 is illustrated as having six blocks 161, 162, 163, 164, 165, and 166; plane 0 of die 116 is illustrated as having six blocks 167, 168, 169, 170, 171, and 172; and plane 1 of die 116 is illustrated as having six blocks 173, 174, 175, 176, 177, and 178.

Each block may include multiple word lines, and each word line may include (e.g., may be coupled to) multiple storage elements. For example, each storage element may be configured as a single-level cell (SLC, storing one bit per storage element) or a multi-level cell (MLC, storing multiple bits per storage element). In some implementations, each block is an erase unit and data is erasable from the memory 106 according to a block-by-block granularity. One or more of the memory dies 110-116 may include a two dimensional (2D) memory configuration or a three dimensional (3D) memory configuration. The memory 106 may store data such as the user data 122 or encoded user data, e.g., a codeword 180, as described further herein.

The memory 106 may include support circuitry associated with the memory 106. For example, the memory 106 may be associated with circuitry to support operation of the storage elements of the dies 110-116, such as read circuit 182 and write circuit 184. Although depicted as separate components, the read circuit 182 and the write circuit 184 may be combined into a single component (e.g., hardware and/or software) of the memory 106. Although the read circuit 182 and the write circuit 184 are depicted as external to the dies 110-116, each of the individual dies 110-116 may include respective read and write circuits that are operable to read and/or write from the individual die independent of any other read and/or write operations at any of the other dies.

The controller 108 may be coupled to the memory 106 (or dies 110-116) via a bus 186, an interface (e.g., interface circuitry), another structure, or a combination thereof. For example, the bus 186 may include multiple distinct channels to enable the controller 108 to communicate with each of the dies 110-116 in parallel with, and independently of, communication with the other memory dies.

In some embodiments, the controller 108 can receive data and instructions from and send data to the host device 104, via the communication path 118, while the data storage device 102 is operatively coupled to the host device 104. The controller 108 can further send data and commands to the memory 106 and to receive data from the memory 106. For example, the controller 108 can send data and a write command to instruct the memory 106 to store the data to a specified metablock. Specifically, the controller 108 can send a first portion of write data and a first physical address of a first group of blocks (e.g., 132 and 138) of the specific metablock to the die 110, a second portion of the write data and a second physical address of a second group of blocks (e.g., 144 and 150) of the specific metablock to the die 112, a third portion of the write data and a third physical address of a third group of blocks (e.g., 156 and 162) of the specific metablock to the die 114, and a fourth portion of the write data and a fourth physical address of a fourth group of blocks (e.g., 168 and 174) of the specific metablock to the die 116. The controller 108 can then send a read request to the memory 106 to read the first portion of data from the die 110 using the first physical address, the second portion of data from the die 112 using the second physical address, the third portion of data from the die 114 using the third physical address, and the fourth portion of data from the die 116 using the fourth physical address. As such, the controller 108 may operate multiple metablocks in parallel. The configurations of various metablocks shall be discussed in further detail below with respect to FIGS. 2A-B.

Referring still to FIG. 1, the controller 108 includes a program/erase cycle (PEC) analyzer 182 and an allocation manager 184, communicatively coupled with each other, in accordance with some embodiments of the present disclosure. Each of the PEC analyzer 182 and allocation manager 184 may be implemented in hardware, or a combination of hardware and software. For instance, each of the PEC analyzer 182 and allocation manager 184 can include any application, program, library, script, task, service, process or any type and form of executable instructions executing on hardware of a device. The hardware may include circuitry such as one or more processors in one or more embodiments.

In an embodiment, the PEC analyzer 182 assigns a first PEC to a first metablock based on a first number of the structures of the memory across which a first metablock is distributed, and assigns a second PEC to a second metablock based on a second number of the structures of the memory across which a second metablock is distributed. The allocation manager 184 may select one of the first metablock or the second metablock for use based on the first PEC and the second PEC.

In another embodiment, the PEC analyzer 182 identifies one or more metablocks logically composed of respective blocks of the memory 106 and the respective number of the structures of the memory across which the one or more metablocks are each distributed, assigns PECs based on the identified respective numbers of structures, and uses the metablocks in accordance with the assigned PECs. In an embodiment, the PEC analyzer 182 determines a twistedness of each of the one or more metablocks by comparing the number of structures across which each metablock is distributed with a maximum number of the structures of the memory, assigns each of the metablocks with a twisted exponent according to the twistedness, and manages the assigned twisted exponents of the one or more metablocks. Further, during the operation of the data storage device 102, the PEC analyzer 182 monitors or counts the PEC of each of the one or more metablocks (hereinafter "real PEC"), and based on the respective twisted exponents and real PECs, the PEC analyzer 182 assigns each of the one or more metablocks with another PEC (hereinafter "reported PEC") by perturbing the real PEC. The term "real PEC" as used herein may be referred to as a number of PECs for which each metablock has been used. The PEC analyzer 182 may cause the allocation manager 184 to use the reported PECs to select which of the metablocks for a write operation. Additional details of the operations of the controller 108 shall be discussed with respect to the methods of FIGS. 3 and 4.

Figure 2A:
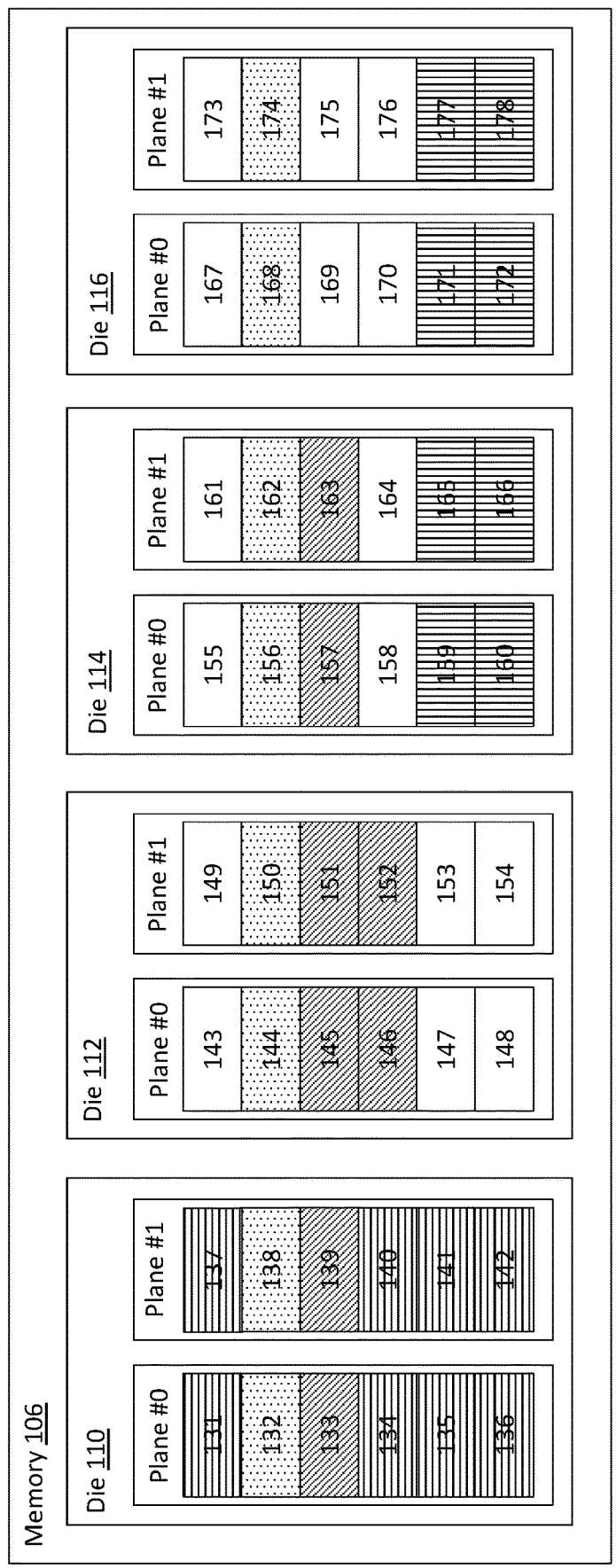
FIG. 2A is a schematic diagram illustrating a number of metablocks of the memory of the system of FIG. 1 according to an example embodiment.
Figure 2B:
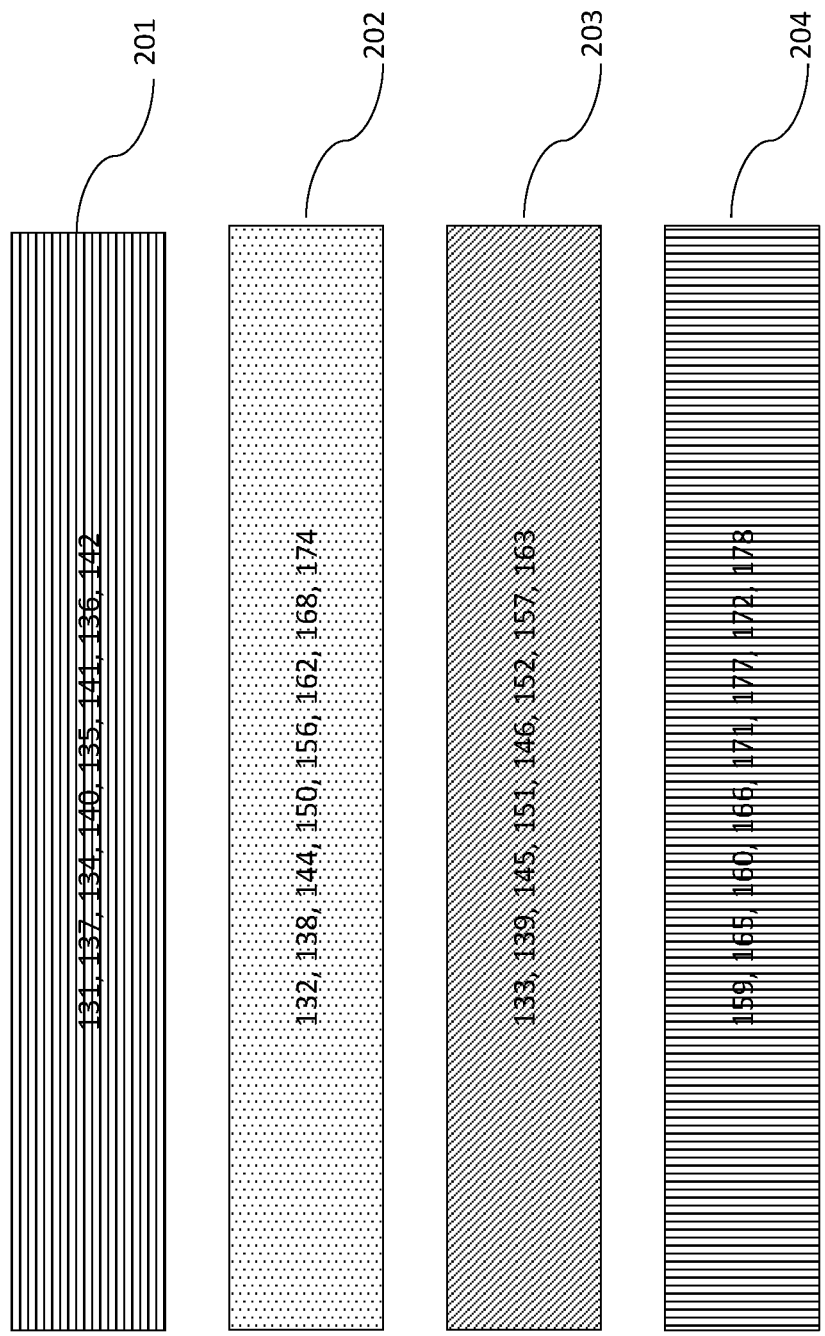
FIG. 2B is a schematic diagram illustrating the metablocks of FIG. 2A that are regrouped according to an example embodiment.

FIG. 2A depicts exemplary metablocks 201, 202, 203, and 204, each of which is logically composed of a respective group of blocks across the dies 110-116 of the memory 106. In some embodiments, the configuration (e.g., linking) of each of the metablocks 201-204 may be determined during a production stage of the data storage device 102 or memory 106. In accordance with the illustrated embodiment of FIG. 2A (and FIG. 1) where each die has two planes, a metablock may be defined to include at least two blocks from different planes of a single die. In FIG. 2B, in addition to showing the component blocks of each of the metablocks 201-204 in the memory 106, the component blocks of each of the metablocks 201-204 are regrouped and separately illustrated.

As shown, the metablock 201 (filled with a horizontal pattern in FIGS. 2A-B) includes the blocks 131 and 137 that are respectively formed on the plane 0 and plane 1 of the die 110, the blocks 134 and 140 respectively formed on the plane 0 and plane 1 of the die 110, the blocks 135 and 141 respectively formed on the plane 0 and plane 1 of the die 110, and the blocks 136 and 142 respectively formed on the plane 0 and plane 1 of the die 110. The metablock 202 (filled with a dotted pattern in FIGS. 2A-B) includes the blocks 132 and 138 that are respectively formed on the plane 0 and plane 1 of the die 110, the blocks 144 and 150 respectively formed on the plane 0 and plane 1 of the die 112, the blocks 156 and 162 respectively formed on the plane 0 and plane 1 of the die 114, and the blocks 168 and 174 respectively formed on the plane 0 and plane 1 of the die 116. The metablock 203 (filled with a diagonal pattern in FIGS. 2A-B) includes the blocks 133 and 139 that are respectively formed on the plane 0 and plane 1 of the die 110, the blocks 145 and 151 respectively formed on the plane 0 and plane 1 of the die 112, the blocks 146 and 152 respectively formed on the plane 0 and plane 1 of the die 112, and the blocks 157 and 163 respectively formed on the plane 0 and plane 1 of the die 114. The metablock 204 (filled with a vertical pattern in FIGS. 2A-B) includes the blocks 159 and 165 that are respectively formed on the plane 0 and plane 1 of the die 114, the blocks 160 and 166 respectively formed on the plane 0 and plane 1 of the die 114, the blocks 171 and 177 respectively formed on the plane 0 and plane 1 of the die 116, and the blocks 172 and 178 respectively formed on the plane 0 and plane 1 of the die 116.

In some embodiments, the PEC analyzer 182 identifies the metablocks 201-204 during a power-on operation, e.g., when the memory is powered up or reset. The PEC analyzer 182 can determine the respective twistedness of each of the metablocks 201-204 by comparing a number of planes of the memory 106 across which each of the metablocks 201-204 is distributed with a total number of the planes of the memory 106. Based on the comparison (which may be presented as a ratio), the PEC analyzer 182 assigns each of the metablocks 201-204 with a twisted exponent or a corresponding index (hereinafter "twisted index").

For example, the PEC analyzer 180 may determine the total number of planes of the memory 106 is 8 because there are four dies, each of which has two planes. Based on the above-discussed principle, since the blocks (131, 137, 134, 140, 135, 141, 136, and 142) of the metablock 201 are distributed across two planes (plane 0 and plane 1 of the die 110), the PEC analyzer 180 may compare the two planes across which the metablock 201 is distributed with the total of eight planes to determine that the metablock 201 occupies ¼ of the total planes. Accordingly, the PEC analyzer 180 may categorize the twistedness of the metablock 201 as "HIGH," and in some embodiments, the PEC analyzer 180 may assign the metablock 201 with a twisted index, "3," out of a group of twisted indices 0, 1, 2, and 3. Similarly, by comparing the respective numbers of planes of the metablocks 202, 203, and 204 with the total of eight planes, the PEC analyzer 180 may categorize the twistedness of the metablocks 202, 203, and 204 as "NORMAL," "LOW," and "MEDIUM," respectively, since the metablocks 202, 203, and 204 respectively occupy eight planes (planes 0 and 1 of the dies 110-116), six planes (planes 0 and 1 of the dies 110-114), and four planes (planes 0 and 1 of the dies 114-116) of the memory 106. In some embodiments, the PEC analyzer 180 may assign the metablock 202 with a twisted index, "0," out of the twisted indices; assign the metablock 203 with a twisted index, "1," out of the twisted indices; and assign the metablock 204 with a twisted index, "2," out of the twisted indices.

As mentioned above, each of the dies of the memory 106 may include fewer or more than four dies and each die may include fewer or more than two planes. In some embodiments, the PEC analyzer 180 can still use the similar principle discussed above to assign the metablocks with corresponding twisted indices by comparing the number of planes (or dies) of the memory 106 across which each of the metablocks is distributed with the total number of the planes (or dies) of the memory 106. In an example where the memory 106 includes four dies and each die has one plane (i.e., a total of four planes), the PEC analyzer 180 can categorize the twistedness of a number of metablocks of the memory 106 into NORMAL (when the blocks are distributed across all four dies/planes), LOW (when the blocks are distributed across three of the four dies/planes), MEDIUM (when the blocks are distributed across two of the four dies/planes), and HIGH (when the blocks are distributed across only one of the four dies/planes). In another example where the memory 106 includes three dies and each die has two planes (i.e., a total of six planes), the PEC analyzer 180 can categorize the twistedness of a number of metablocks of the memory 106 into NORMAL (when the blocks are distributed across all six planes), LOW (when the blocks are distributed across four of the six planes), and HIGH (when the blocks are distributed across only two of the six planes).

In some embodiments, during the production stage of the data storage device 102, the PEC analyzer 182 determines a group of twisted exponents (1), each of which corresponds to a twisted index. For example, the PEC analyzer 182 may determine a group of twisted exponents (1) according to equation (1) shown below.

$$l = \log_2\left(\text{MAX}\left(1 - \frac{1}{k}\right)\right) \quad (1)$$

In equation (1), MAX represents an overall or maximum lifetime of the memory 106 (which may be determined through one or more reliability tests on the memory 106); and k represents a ratio of parameters "b" to "a." In some embodiments, the parameter b may represent a half of the lifetime of the memory 106, i.e., MAX/2; and the parameter a may be determined by a type of the storage element of the memory 106 and one of the following equations (2), (3), (4), (5), (6), and (7). For example, if the storage element of the memory 106 is configured as an SLC (single-level cell), three different values of the parameter a can be determined by equations (2), (3) and (4), respectively.

$$a_1 = b - b >> 4 \quad (2)$$

$$a_2 = b - b >> 3 \quad (3)$$

$$a_3 = b - b >> 2 \quad (4)$$

In another example, if the storage element of the memory 106 is configured as an MLC (multi-level cell), three different values of the parameter a can be determined by equations (5), (6) and (7), respectively.

$$a_1 = b - b >> 5 \quad (5)$$

$$a_2 = b - b >> 4 \quad (6)$$

$$a_3 = b - b >> 3 \quad (7)$$

In equations (2-7), ">>" represents a right shift operator. In some embodiments, using equation (1) in response to MAX (together with the parameter b) being determined, the PEC analyzer 180 may use $a_1$ to calculate k and then the twisted exponent associated with the twisted index 1 (hereinafter "$l_1$"); $a_2$ to calculate k and then the twisted exponent associated with the twisted index 2 ("hereinafter "$l_2$"); and $a_3$ to calculate k and then the twisted exponent associated with the twisted index 3 (hereinafter "$l_3$"). In some embodiments, $l_1$, $l_2$, and $l_3$ may be each a positive number, and $l_3$ is greater than $l_2$ and $l_2$ is greater than $l_1$. Further, the PEC analyzer 180 may calculate the twisted exponent associated with the twisted index 0 (hereinafter "$l_0$") as 0 according to some embodiments.

In some cases, when the data storage device 102 includes or is part of an embedded device, alternatively or additionally to equation (1), the PEC analyzer 180 may represent or calculate the twisted exponents (e.g., $l_1$, $l_2$, $l_3$) in a binary form using equation (8), as shown below.

$$\text{MAX}_c\left(1 - \frac{1}{k}\right) \geq 2^{l_c} \quad (8)$$

In equation (8), $\text{MAX}_c$ represents the closet exponent when MAX is approximated in the binary form; and $l_c$ represents the closet exponent when $l_1$, $l_2$, or $l_3$ is approximated in the binary form. In some embodiments, $\text{MAX}_c$ and $l_c$ are sometimes referred to as convenient MAX and convenient l, respectively.

Figure 3:
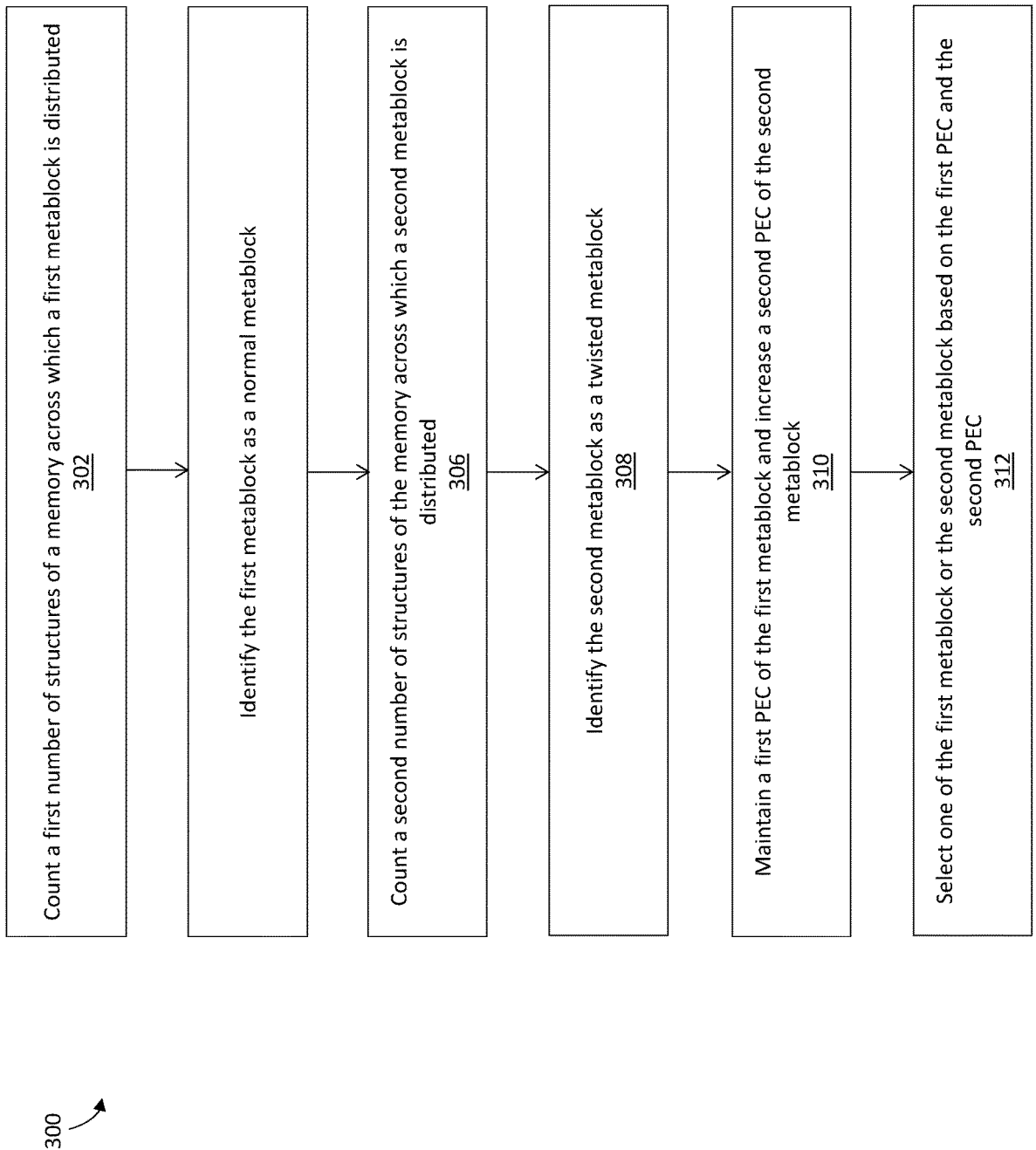
FIG. 3 illustrates a flow chart of a method of operating the system of FIG. 1 according to an example embodiment.

FIG. 3 illustrates a flow chart of an embodiment of a method 300 for selecting one of a first metablock and a second metablock based on the respective assigned PECs, in accordance with various embodiments. The operations of the method 300 are performed by respective components illustrated in FIGS. 1-2B. For purposes of discussion, the following embodiment of the method 300 is described in conjunction with FIGS. 1-2B. The illustrated embodiment of the method 300 is merely an example. Therefore, it should be understood that any of a variety of operations may be omitted, re-sequenced, and/or added while remaining within the scope of the present disclosure.

The method 300 starts with operation 302 in which a first number of the structures of a memory across which a first metablock of a plurality of metablocks is distributed. The memory can include a number of physical blocks. Each metablock of the plurality of metablocks includes a corresponding set of physical blocks. The physical blocks included in the corresponding set of physical blocks of each of the metablocks are distributed across respective structures of the memory, e.g., across respective dies, planes, etc. The method 300 continues to operation 304 in which the first metablock is identified as a normal metablock in response to determining that the first number satisfies a first threshold number of the physical structures of the memory. For example, the first metablock may be identified as normal in response to determining that the first number is equal to a maximum number of the physical structures of the memory.

The method 300 continues to operation 306 in which a second number of the physical structures of the memory across which a second metablock of the plurality of metablocks is distributed. The method 300 continues to operation 308 in which the second metablock is identified as a twisted metablock in response to determining that the second number satisfied a second threshold number. For example, the second metablock may be identified as a twisted metablock in response to determining that the second number is less than the maximum number of the physical structures of the memory. In an operation 310, a first PEC of the first metablock is maintained and a second PEC of the second metablock is increased in response to the identifying of the first and second metablocks. In an operation 312, one of the first metablock or the second metablock is selected for use in a memory operation based on at least one of the first PEC and the second PEC.

In an embodiment, the PEC analyzer 182 of FIG. 1 may be a means for counting the first number of the structures across which the first metablock is distributed, a means for identifying the first metablock as a normal metablock in response to determining that the first number is equal to a maximum number of the structures of the memory, a means for counting the second number of the structures across which the second metablock is distributed, a means for identifying the second metablock as a twisted metablock in response to determining that the second number is less than the maximum number of the structures of the memory, and a means for maintaining a first PEC of the first metablock and increasing a second PEC of the second metablock. The allocation manager 184 of FIG. 1 may be a means for selecting one of the first metablock or the second metablock based on the first PEC and the second PEC.

Figure 4A:
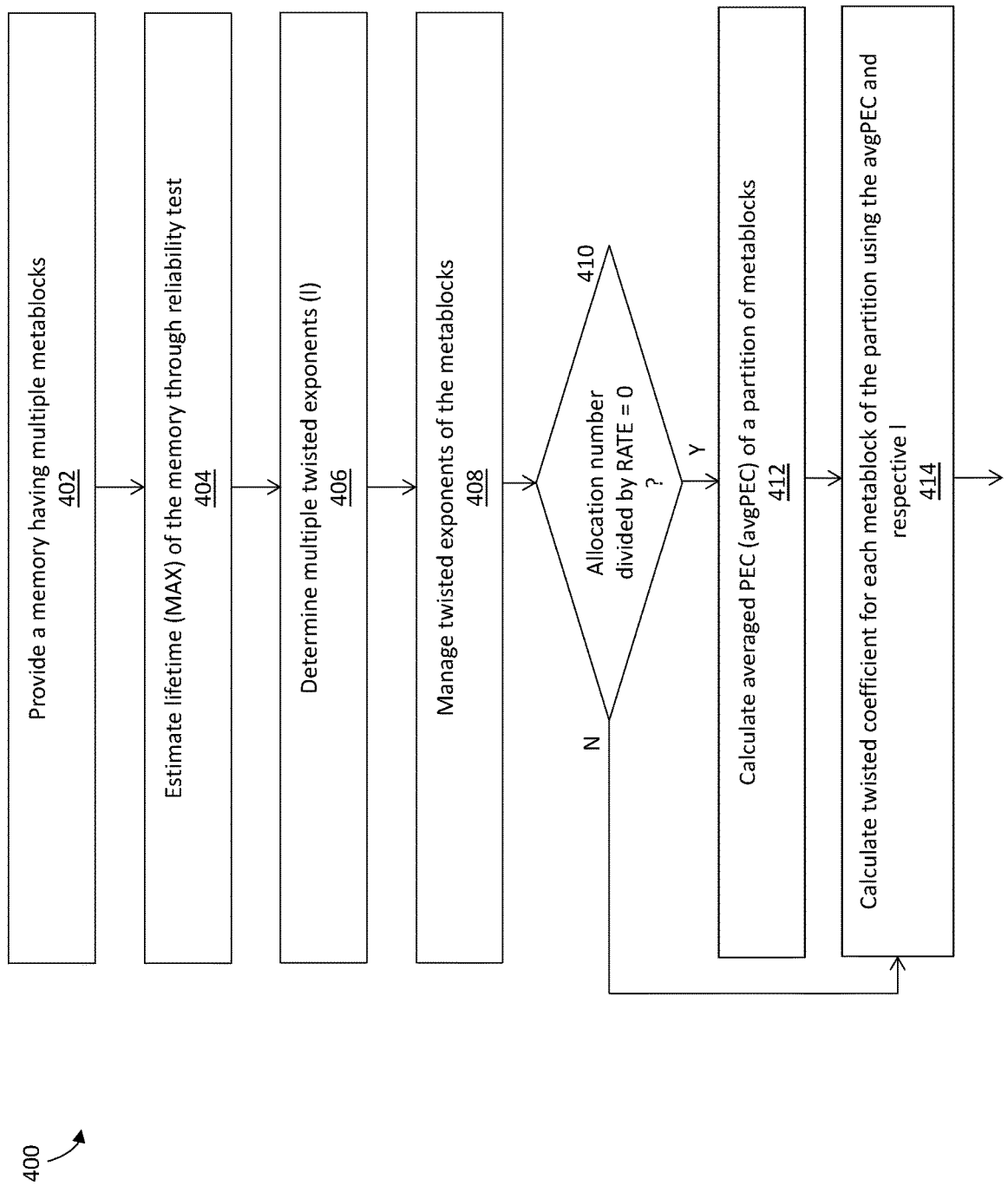
FIGS. 4A and 4B illustrate a flow chart of another method of operating the system of FIG. 1 according to an example embodiment.
Figure 4B:
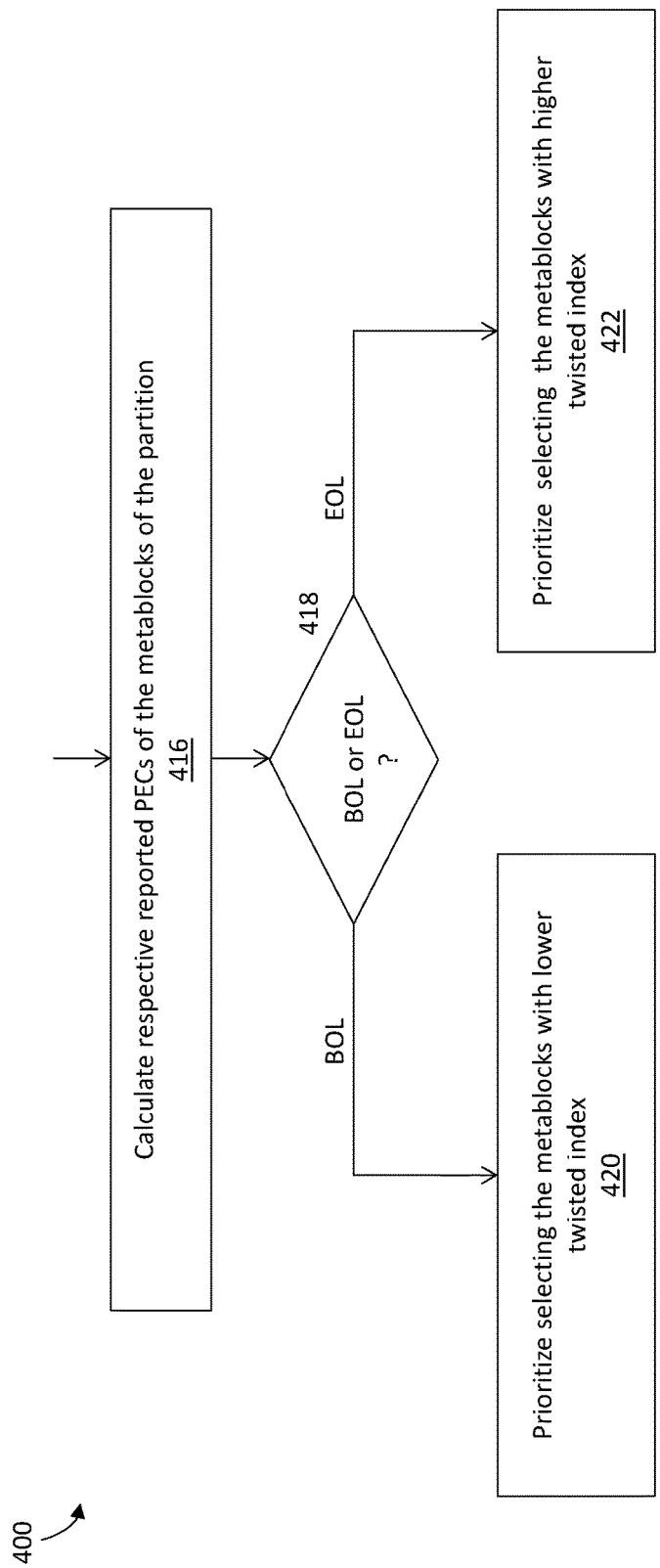

FIGS. 4A and 4B illustrate a flow chart of an embodiment of another method 400 for selecting one or more metablocks for use based on the respective assigned PECs, in accordance with various embodiments. The method 400 may include each of the operations of the method 300 described in a greater detail. The operations of the method 400 are performed by respective components illustrated in FIGS. 1-2B. For purposes of discussion, the following embodiment of the method 400 is described in conjunction with FIGS. 1-2B. The illustrated embodiment of the method 400 is merely an example. Therefore, it should be understood that any of a variety of operations may be omitted, re-sequenced, and/or added while remaining within the scope of the present disclosure.

Referring first to FIG. 4A, the method 400 starts with operation 402 in which a memory including a number of metablocks is provided, in accordance with various embodiments. Using the memory 106 of the data storage device 102 shown in FIGS. 1-2B as an example, the memory 106 includes metablocks 201-204, each of which is composed of a respective group of blocks of the memory 106. In some embodiments, the logical linking of each of the metablocks 201-204 may be determined during a production stage of the data storage device 102.

The method 400 continues to operation 404 in which a lifetime of the memory (MAX) is estimated through a reliability test, in accordance with various embodiments. The lifetime of the memory 106 (MAX), as described herein, may be referred to as a maximum PEC at which the memory 106 can still maintain a data retention rate greater than a threshold. In some embodiments, MAX of the memory 106 can be determined through one or more reliability tests such as, for example, a stress-test-driven test, a program/erase and data retention stress test, and/or the like, during the production state of the data storage device 102. In some embodiments, the PEC analyzer 182 may perform such one or more reliability tests on the memory 106 or communicate with another test equipment/device performing the reliability tests to retrieve, store, or otherwise manage the value of MAX of the memory 106.

The method 400 continues to operation 406 in which a number of twisted exponents (l) are determined, in accordance with various embodiments. In some embodiments, the PEC analyzer 182 can determine the twisted exponents (e.g., $l_1, l_2, l_3$) using either equation (1) or (8). As discussed above, based on equation (1) or (8), the type of storage elements (e.g., an SLC or MLC) used to determine the value of parameter a, and the estimated MAX used to determine the value of parameter b, the PEC analyzer 182 can calculate, estimate, or otherwise determine the respective values of the twisted exponents and associate the twisted exponents with respective twisted indices. In some embodiments, the PEC analyzer 182 can determine the values of the twisted exponents during the production state of the data storage device 102.

For example, in response to determining that the storage element of the memory 106 includes an SLC, three different value of the parameter a can be determined using equations (2), (3), and (4), respectively. Once MAX is determined (e.g., at operation 404), the value of parameter b (MAX/2) can also be determined. As such, using either equation (1) or (8), three different values of the twisted exponent (e.g., $l_1, l_2, l_3$) can be determined, which can be associated with twisted indices 1, 2, and 3, respectively. In some embodiments, a value of the twisted exponent, associated with the twisted index 0, may be determined as 0.

The method 400 continues to operation 408 in which respective twisted exponents of the metablocks are managed, in accordance with various embodiments. In some embodiments, the PEC analyzer 182 can manage the respective twisted exponents of the metablocks of the memory 106 by identifying or counting the respective blocks that logically constitute each of the metablocks of the memory 106, determining the respective twistedness of each of the metablocks of the memory 106 by assigning a twisted exponent, and keeping the assigned twisted exponents of the metablocks in a table (a bitmap table). In some embodiments, the PEC analyzer 182 may perform such a "management" function subsequently to the production stage of the data storage device 102, and in particular, simultaneously with or subsequently to the data storage device 102 being powered on or reset.

Continuing with the example shown in FIGS. 2A-B, in response to the data storage device 102 being powered on or reset, the PEC analyzer 182 can identify the metablocks 201-204. By counting the respective number of planes across which each of the metablocks 201-204 is distributed and comparing the counted numbers with the total number of planes of the memory 106, the PEC analyzer 182 can assign each of the metablocks 201-204 with a respective twisted exponent (or twisted index). As discussed above with respect to FIGS. 2A-B, the PEC analyzer 182 may assign the metablock 201 with the twisted index 3, assign the metablock 202 with the twisted index 0, assign the metablock 203 with the twisted index 1, and assign the metablock 204 with the twisted index 2. In some embodiments, the metablock assigned with the twisted index 0 may be referred to as a normal metablock, and the metablock assigned with the twisted index other than the twisted index 0 may be referred to as a twisted metablock. For example, the metablock 202 may be a normal metablock, and the metablocks 201, 203, and 204 may each be a twisted metablock (with a respective twistedness).

The method 400 continues to operation 410 in which a total number of allocation operations is compared with a predefined parameter (RATE), in accordance with various embodiments. According to some embodiments, an allocation operation may be referred to as an event in which data (e.g., user data 122 and/or codeword 180) is transferred from one metablock to another metablock of the memory 106. The PEC analyzer 182 may start counting the total number of allocation operations (e.g., increasing the count by 1) in response to detecting an allocation operation since the data store device 102 was powered on. In some embodiments, the counted allocation operations include the allocation operations that have occurred and are occurring.

In some embodiments, at operation 410, the PEC analyzer 182 can perform a modulo operation (typically referred to as "mod") on the counted number of allocation operations (hereinafter "allocation number") and the parameter RATE to determine whether to update the averaged PEC of a partition of metablocks (which shall be discussed below). Specifically, if a remainder of the modulo operation is equal to 0 (e.g., allocation number mod RATE=0), the PEC analyzer 182 may continue to operation 412 to update the averaged PEC of the partition; and if a remainder of the modulo operation is not equal to 0 (e.g., allocation number mod RATE≠0), the PEC analyzer 182 may proceed to operation 414 to calculate respective coefficients of the metablocks. For example, when the parameter RATE is defined as 128, the PEC analyzer 182 may perform operation 412 in response to determining that the allocation number is equal to 0, 128, 256, 512, etc.; and perform operation 414 in response to determining that the allocation number is not equal to 0, 128, 256, 512, etc.

The term "PEC" of a metablock, as used herein, may be referred to as a sequence of events in which data is written to the metablock, then erased, and then rewritten. In some embodiments, since the data storage device 102 was powered on, the PEC analyzer 182 may monitor, count, or otherwise manage the PEC (program/erase cycle) of each of the metablocks of the memory 106. For example, in response to detecting such an event occurring to a metablock, the PEC analyzer may increase the PEC of the metablock by one. Such a monitored PEC may be sometimes referred to as a "real PEC." Further, the PEC analyzer 182 can monitor respective real PECs of a number of metablocks in a partition, for example, metablocks 201-204, and calculate an average value of the real PECs (hereinafter "avgPEC").

In response to determining the remainder equal to 0 (operation 410), at operation 412, the PEC analyzer 182 may update (e.g., recalculate) avgPEC of the metablocks 201-204 in the partition, in accordance with various embodiments. In response to determining the remainder not equal to 0 (operation 410) or subsequently to operation 412, at operation 414, the PEC analyzer 182 may maintain the previously calculated avgPEC or adopt the newly updated avgPEC of the metablocks 201-204 in the partition to perform further calculation, in accordance with various embodiments.

Referring still to operation 414, and in greater detail, the PEC analyzer 182 may use the avgPEC, MAX, and l (the respective twisted exponent of each metablock) to calculate a respective twisted coefficient for each of the metablocks based on equation (9), as shown below.

$$\left(\frac{MAX - avgPEC}{MAX}\right) 2^l \qquad (9)$$

In the embodiments where the data storage device 102 includes or is part of an embedded device, the PEC analyzer 182 may use the avgPEC, $MAX_c$, and $l_c$ (the respective convenient twisted exponent of each metablock) to calculate a respective twisted coefficient for each of the metablocks based on equation (10) or (11), as shown below.

$$(1 - avgPEC \gg MAX_c) 2^{l_c} \qquad (10)$$

$$(1 \ll l_c) - (avgPEC \ll l_c) \gg MAX_c \qquad (11)$$

In equation (11), "$\gg$" represents a right shift operator; and "$\ll$" represents a left shift operator.

Referring then to FIG. 4B, the method 400 continues to operation 416 in which respective reported PECs of the metablocks in the partition are calculated, in accordance with various embodiments. According to some embodiments of the present disclosure, the PEC analyzer 182 can combine the respective real PECs, as dynamically monitored by the PEC analyzer 182, and twisted coefficients, as calculated at operation 314, to provide respective perturbed PECs or reported PECs. For example, the PEC analyzer 182 may calculate the reported PEC for a metablock according to one of the following equations (12), (13), and (14) (which are based on equations (9), (10), and (11), respectively).

$$reported\ PEC = realPEC + \left(\frac{MAX - avgPEC}{MAX}\right) 2^l \qquad (12)$$

$$reported\ PEC = realPEC + (1 - avgPEC \gg MAX_c) 2^{l_c} \qquad (13)$$

$$reported\ PEC = realPEC + (1 \ll l_c) - (avgPEC \ll l_c) \gg MAX_c \qquad (14)$$

Using equation (12) as an example and referring again to FIGS. 2A-B, since the PEC analyzer 182 has identified the metablock 202 as a normal metablock and associated the metablock 202 with the twisted index 0 (l=0), the reported PEC of metablock 202 is identical to its respective realPEC. In other words, the metablock 202's realPEC is maintained. On the other hand, since the PEC analyzer 182 has identified the metablock 201 as a twisted metablock and associated the metablock 201 with the twisted index 3 ($l_3 \neq 0$), the reported PEC of metablock 201 is increased from its respective realPEC; and since the PEC analyzer 182 has identified the metablock 203 as a twisted metablock and associated the metablock 203 with the twisted index 1 ($l_1 \neq 0$), the reported PEC of metablock 203 is increased from its respective realPEC. Further, since $l_3$ is greater than $l_1$ (the metablock 201 is more twisted than the metablock 203), the PEC analyzer 182 may increase the metablock 201's realPEC by a greater amount than the amount that the PEC analyzer 182 may increase the metablock 203's realPEC. As such, in the case where the metablock 201 and 203 share a same realPEC, the metablock 201 may present a greater reported PEC.

The method 400 continues to operation 418 to determine whether the memory 106 is at the beginning of life (BOL) or the end of life (EOL), in accordance with various embodiments. The PEC analyzer 182 may determine whether the memory 106 is at BOL or EOL based on whether a number of the metablocks in the memory 106 that are capable of being written is less than a predefined threshold, in accordance with some embodiments. Such a threshold can be a predefined percentage of the metablocks in the memory 106 that are capable of being written. If the PEC analyzer 182 determines that the number is greater than the threshold (at the BOL), the PEC analyzer 182 may communicate with the allocation manager 184 to cause the allocation manager 184 to prioritize selecting the metablocks with a lower twisted index for performing a write operation (operation 420). On the other hand, if the PEC analyzer 182 determines that the number is equal to or less than the threshold (at the EOL), the PEC analyzer 182 may communicate with the allocation manager 184 to cause the allocation manager 184 to prioritize selecting the metablocks with a higher twisted index for performing a write operation (operation 422).

In some embodiments, when the memory 106 is at the BOL, the metablocks associated with a zero twisted index (e.g., metablock 202) or a relatively low twisted index (e.g., metablock 203) may each present a lower reported PEC than the metablocks associated with a relatively higher twisted index (e.g., metablock 201). According to the reported PECs, the allocation manager 184 may prioritize selecting the metablock with a lowered twisted index (thereby presenting a lower reported PEC) over the metablock with a higher twisted index (thereby presenting a higher reported PEC) at the BOL of the memory 106. While the usage of memory 106 is accumulated, the memory 106 moves toward the EOL, which may in turn increase avgPEC. Referring again to the equations (12)-(14), when avgPEC is increased, the effect by which reported PEC is increased from realPEC (e.g.

$$\left(\frac{MAX - avgPEC}{MAX}\right) 2^l$$

of equation (12)) is reduced, which may cause the metablocks associated with a higher twisted index to each present a reported PEC similar as, or lower than, the metablocks associated with a zero twisted index or lower twisted index. As such, when the metablocks with the higher twisted index present a reported PEC similar to or lower than the metablocks with the lower twisted index, the allocation manager 184 may prioritize using the metablock with the higher twisted index over the metablock with the lower twisted index at the EOL of the memory 106.

Continuing with the above example, in response to determining that the memory 106 is at the BOL, the allocation manager 184 may avoid using the metablock with a higher reported PEC such as the metablocks associated with reported PECs that have been "increased" relatively more. Instead, the allocation manager 184 may select the metablock with a lower reported PEC such as the metablocks associated with reported PECs that have been "maintained" or increased relatively less. For example, the allocation manager 184 may prioritize using the metablock 202 (with twisted index 0) over the metablock 204 (with twisted index 2), and/or prioritize using the metablock 203 (with twisted index 1) over the metablock 201 (with twisted index 3) for performing a write operation during the BOL. In some embodiments, the allocation manager 184 may use such non-prioritized metablock(s) for storing cold data at the background while the prioritized metablock(s) are storing hot data. On the other hand, when the memory 106 is at the EOL or toward the EOL, the allocation manager 184 may prioritize using the metablock 204 (with twisted index 2) over the metablock 202 (with twisted index 0), and/or prioritize using the metablock 201 (with twisted index 3) over the metablock 203 (with twisted index 1) for performing a write operation. As such, the metablocks of the memory 160 can be used more evenly.

The preceding description is directed to certain implementations for the purposes of describing the innovative aspects of this disclosure. However, a person having ordinary skill in the art will readily recognize that the teachings herein can be applied in a multitude of different ways. The described implementations may be included in or associated with a variety of electronic devices such as, but not limited to: mobile telephones, multimedia Internet enabled cellular telephones, mobile television receivers, wireless devices, smartphones, Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, wearable devices, clocks, calculators, television monitors, flat panel displays, electronic reading devices (such as e-readers), computer monitors, auto displays (such as odometer and speedometer displays), cockpit controls and displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, in addition to non-EMS applications), aesthetic structures (such as display of images on a piece of jewelry or clothing) and a variety of EMS devices.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, such as a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, a person having ordinary skill in the art will readily appreciate, directional terms are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A controller configured to:
   determine twistedness of each metablock of a plurality of metablocks of equal size, including at least a first twistedness of a first metablock and a second twistedness of a second metablock, the twistedness of a metablock obtained from comparison of a number of structures across which an individual metablock is distributed and a maximum number of structures for a metablock;
   monitor real program/erase cycles (PECs) of the plurality of metablocks, including at least real PEC of the first metablock and real PEC of the second metablock, by counting PECs for each of the plurality of metablocks;
   assign a first reported program/erase cycle (PEC) to the first metablock based on the first twistedness in combination with the first real PEC;
   assign a second reported PEC to the second metablock based on the second twistedness in combination with the second real PEC; and
   select the first metablock to be used from the plurality of metablocks based on the first reported PEC being lower than at least the second reported PEC.

2. The controller of claim 1, wherein the controller is further configured to:
   monitor real program/erase cycles (PECs) of the plurality of metablocks, including at least real PEC of the first metablock and real PEC of the second metablock, by counting PECs for each of the plurality of metablocks;
   assign the first reported PEC based on the first twistedness in combination with the first real PEC; and
   assign the second reported PEC based on the second twistedness in combination with the second real PEC.

3. The controller of claim 2, wherein the controller is further configured to:
   determine the first metablock is a normal metablock based on the first number of the structures of the memory across which the first metablock is distributed being equal to the maximum number of structures for a metablock; and
   determine the second metablock is a twisted metablock based on the second number of the structures of the memory across which the second metablock is distributed being less than the maximum number of structures for a metablock, wherein the second number is less than the first number.

4. The controller of claim 2, wherein to assign the first reported PEC, the controller is configured to at least in part maintain the first PEC at a same value as the real PEC of the first metablock, and wherein to assign the second reported PEC, the controller is configured to at least in part increase the second PEC to a value greater than the real PEC of the second metablock.

5. The controller of claim 1, wherein the controller is further configured to prioritize using the first metablock over the second metablock in response to a power-on operation of the memory system.

6. The controller of claim 1, wherein the controller is further configured to prioritize using the second metablock over the first metablock in response to determining that a number of the metablocks that are capable of being written is less than a predefined threshold.

7. The controller of claim 1, wherein the controller is further configured to:
   determine the first metablock as a normal metablock in response to determining the first metablock is distributed across the maximum number of structures number, and
   determine the second metablock as a twisted metablock in response to determining the second metablock is distributed across less than the maximum number of structures.

8. The controller of claim 1, wherein the controller is further configured to:
   monitor real program/erase cycles (PECs) of the plurality of metablocks, including at least real PEC of the first metablock and real PEC of the second metablock, by counting a number of PECs for which the second metablock has been used;
   increase the real PEC of the second metablock to obtain a second reported PEC by combining the second PEC with a positive term;
   determine a maximum PEC of the memory and a plurality of twisted exponents for the plurality of metablocks, an individual metablock having a twisted exponent according to twistedness of the individual metablock; and
   associate the second metablock with a twisted exponent of the plurality of twisted exponents.

9. The controller of claim 8, wherein the controller is further configured to calculate the positive term based on the maximum PEC of the memory, an average of respective real PECs of the plurality of metablocks, and the twisted exponent that indicates twistedness of a metablock.

10. The controller of claim 1, wherein the controller is further configured to determine when a Beginning Of Life (BOL) condition exists and in response prioritize metablocks with lower twistedness and determine when an End Of Life (EOL) condition exists and in response prioritize metablocks with higher twistedness.

11. A memory system, comprising:
    a memory comprising a plurality of physical blocks, wherein each of a plurality of metablocks includes a corresponding set of the physical blocks, and wherein physical blocks included in the corresponding set of physical blocks of each of the metablocks are equal in number and are distributed across different numbers of respective structures of the memory with metablocks assigned a different twisted index according to numbers of respective structures across which they are distributed; and a controller configured to:
    identify a first metablock of the plurality of metablocks and a first number of the structures of the memory across which the first metablock is distributed;
    associate the first metablock with a first twisted index in response to determining that the first number is equal to a maximum number of the structures of the memory;
    identify a second metablock of the plurality of metablocks and a second number of the structures of the memory across which the second metablock is distributed;
    associate the second metablock with a second twisted index that is higher than the first twisted index in response to determining that the second number is less than the maximum number of the structures of the memory;
    monitor real program/erase cycles (PECs) of the plurality of metablocks, including at least real PECs of the first metablock and the second metablock, by counting PECs for each of the plurality of metablocks;
    assign a first reported PEC to the first metablock based on the first twisted index and the real PEC of the first metablock and assign a second reported PEC that is greater than the first reported PEC to the second metablock based on the second twisted index and the real PEC of the second metablock; and
    cause the first metablock to be selected for a write operation based on the assigned first reported PEC being less than the assigned second reported PEC.

12. The memory system of claim 11, wherein the controller is further configured to select the first metablock over the second metablock for the write operation in response to the memory system being initially powered on.

13. The memory system of claim 12, wherein the controller is further configured to select the second metablock over the first metablock for the write operation in response to determining that a number of the metablocks that are capable of being written is less than a predefined threshold.

14. The memory system of claim 11, wherein the controller is further configured to determine whether to maintain or increase monitored first and second reported PECs based on a maximum PEC of the memory, an average of respective real PECs of the plurality of metablocks, and the first or second twisted index.

15. The memory system of claim 14, wherein the controller is further configured to determine the monitored first real PEC by counting a number of PECs for which the first metablock has been used, and determine the first twisted index as zero to maintain the monitored first real PEC as the assigned first reported PEC.

16. The memory system of claim 14, wherein the controller is further configured to determine the monitored second real PEC by counting a number of PECs for which the second metablock has been used, and determine the second twisted index as non-zero to assign the second reported PEC a value greater than the second real PEC.

17. A method, comprising:
    counting a first number of the structures of a memory across which a first metablock of a plurality of metablocks is distributed to determine twistedness of the first metablock, wherein the memory comprises a plurality of physical blocks, wherein each metablock of the plurality of metablocks includes a corresponding set of the physical blocks, each metablock of the plurality of metablocks having an equal number of blocks, wherein physical blocks included in the corresponding set of physical blocks of each of the metablocks are distributed across different numbers of respective structures of the memory, and twistedness of a metablock is obtained from comparison of a number of structures across which an individual metablock is distributed and a maximum number of structures for a metablock;
    identifying the first metablock as a normal metablock having a first twistedness in response to determining that the first number is equal to a maximum number of the structures of the memory;
    counting a second number of the structures of the memory across which a second metablock of the plurality of metablocks is distributed;
    identifying the second metablock as having a second twistedness in response to determining that the second number is less than the maximum number of the structures of the memory;
    monitoring real program/erase cycles (PECs) of the plurality of metablocks, including at least real PEC of the first metablock and real PEC of the second metablock, by counting PECs for each of the plurality of metablocks;
    maintaining a first reported program/erase cycle (PEC) of the first metablock based on the real PEC of the first metablock in combination with the first twistedness;
    maintaining a second reported PEC of the second metablock based on the real PEC of the second metablock in combination with the second twistedness; and
    selecting the first metablock based on the first reported PEC being lower than at least the second reported PEC.

18. The method of claim 17, further comprising:
    selecting the first metablock over the second metablock for a write operation in response to the memory system being initially powered on.

19. The method of claim 17, further comprising:
    selecting the second metablock over the first metablock in response to determining that a number of the metablocks that are capable of being written is less than a predefined threshold.

20. The method of claim 17, further comprising:
    determining a maximum PEC of the memory and a plurality of twisted exponents of the plurality of metablocks according to numbers of respective structures across which they are distributed;
    associating the first metablock with a first twisted index that represents the first twistedness and the second metablock with a second twisted index that represents the second twistedness; and
    determining whether to maintain or increase the first and second PECs based on the maximum PEC of the memory, an average of respective PECs of the plurality of metablocks, and the first twisted index or the second twisted index.

* * * * *